United States Patent [19]

Schneider

[11] 4,118,852

[45] Oct. 10, 1978

[54] PISTON PIN REMOVER AND INSTALLER

[76] Inventor: Peter F. Schneider, 5540 Elmgrove, Warren, Mich. 48092

[21] Appl. No.: 803,155

[22] Filed: Jun. 3, 1977

[51] Int. Cl.2 ............ B23Q 1/00

[52] U.S. Cl. ............ 29/283; 29/251

[58] Field of Search ............ 29/251, 255, 257, 276, 29/280, 282, 283, 256, 258, 263; 269/296

[56] References Cited

U.S. PATENT DOCUMENTS

| | | | |
|---|---|---|---|
| 2,891,302 | 6/1959 | Fuglie et al. | 29/251 |
| 3,031,744 | 5/1962 | Stein | 29/283 |
| 3,050,840 | 8/1962 | Dunkerley | 29/263 |
| 4,050,139 | 9/1977 | Okamuro | 29/283 |

FOREIGN PATENT DOCUMENTS

| | | | |
|---|---|---|---|
| 922,820 | 2/1947 | France | 29/256 |

*Primary Examiner*—James L. Jones, Jr.

*Attorney, Agent, or Firm*—Burton, Parker & Schramm

[57] ABSTRACT

Relates to tooling devices for removing piston pins for automobile engine pistons for repair or replacement and for installing a repaired or new pin in the piston. More specifically, the invention accomplishes these objects without imposing any load on the piston, thus eliminating the possibility of distorting or otherwise damaging the softer piston. Instead, one of the supporting structures of the tool is shaped in a special way to enter the skirt of the piston and underlay the smaller end of the connecting rod in opposing relation to the driving forces tending to advance the piston pin through the bore of the connecting rod either to remove the pin or to install the repaired pin or its replacement. Other features of the invention have to do with the provisions associated with the same tooling device for centering the piston pin in the bore of the connecting rod and for employing the opposite ends of a support block for performing the steps of both removing and installing piston pins in the aligned bores of the piston and connecting rod assemblies.

1 Claim, 4 Drawing Figures

PISTON PIN REMOVER AND INSTALLER

BACKGROUND OF THE INVENTION

This invention relates to devices or fixtures for holding automobile engine parts while work is performed thereon and more particularly to piston and connecting rod assemblies for the removal and installation of piston pins.

It has been the prior practice to hold or otherwise subject the pistons to considerable pressures while the piston pins were removed therefrom or installed therein. Such practice resulted in distorted pistons or damage to the bores in the pistons through which the piston pins were forced. Piston pins, also referred to as the wrist pins, have been generally made of hollow case-hardened steel members, whereas the pistons were made of softer metal, usually an aluminum alloy, and were frequently damaged by improperly forced piston pins. In addition, during this operation the pistons were subjected to strong clamping pressures as their wrist pins were either forced into or out of the bores of the pistons and connecting rods, and a great deal of care had to be exercised in order to avoid damage to these parts. It is apparent from the foregoing description that there has been a need for an improved tool or fixture for removing and installing piston pins in pistons and connecting rods of automobile engines.

SUMMARY OF THE INVENTION

A tooling device constructed in accordance with the present invention eliminates the need for subjecting the piston to holding or clamping pressures while undergoing the removal or installation of a wrist pin. Such a device also has provision for enabling the wrist pin to be centrally fitted within the bores of the connecting rod and piston and further provision for adjustment of the tool to accommodate different sizes of wrist pins.

It is therefore an important object of the invention to eliminate the need for subjecting the piston to holding or clamping pressures while undergoing the removal or installation of a wrist pin.

Another important object of the invention is to provide a mounting arrangement which, in the performance of removing and installing wrist pins, transfers the forces heretofore endured by the piston with resulting damage thereto to the stronger connecting rod and the mounting support therefor.

Another important object of the invention is to provide a positioning device for automatically centering the installed wrist pin within the bores of the piston and connecting rod, the positioning device being adjustable to accommodate different sizes of wrist pins.

A further important object of the invention is to provide a tool or fixture for the removal and replacement of wrist pins which is designed for handling a great majority if not substantially all sizes of such pins used in the automobile industry.

In carrying out these and other objects of the invention, a tooling device or fixture is contemplated which is designed to remove piston pins from conventional piston and connecting rod assemblies for repair or replacement thereof and to install the repaired or replaced pin back into the piston and connecting rod assembly in a manner transfering the holding or clamping pressures heretofore applied against the softer piston to the stronger connecting rod. In a preferred design this is accomplished by providing a mounting surface of strong material for the connecting rod which is shaped in one area thereof to enter the skirt of the piston and supportingly engage the boss of the connecting rod into which the piston pin is received. The inserted area of the mounting surface is shaped to underlay this connecting rod boss and supportingly withstand the clamping and power applied pressures exerted to move the pin through the aligned bores of the piston and connecting rod.

For reducing weight and cost, the mounting surface for the connecting rod takes the form of a supporting block of strong material, such as tool steel, removably attached to the upper end of a base member composed of weaker and less expensive material.

To enable the tooling device to be used with piston pins of different sizes, it is provided with an adjustable gauge member which, depending on its setting, will block further movement of the piston pin through the bores of the piston and connecting rod when the piston pin is longitudinally centered with respect to these bores. In the embodiment of the invention illustrated herein, such an adjustment feature takes the form of a gauging member having a series of steps of progressively differing heights, each step signifying a different setting of the member for one of a plurality of different piston pin sizes.

BRIEF DESCRIPTION OF THE DRAWING

Various other objects, advantages and meritorious features of the invention will become more fully apparent from the following specification, appended claims and accompanying drawing sheets, wherein:

DESCRIPTION OF A PREFERRED EMBODIMENT

Figure 1:
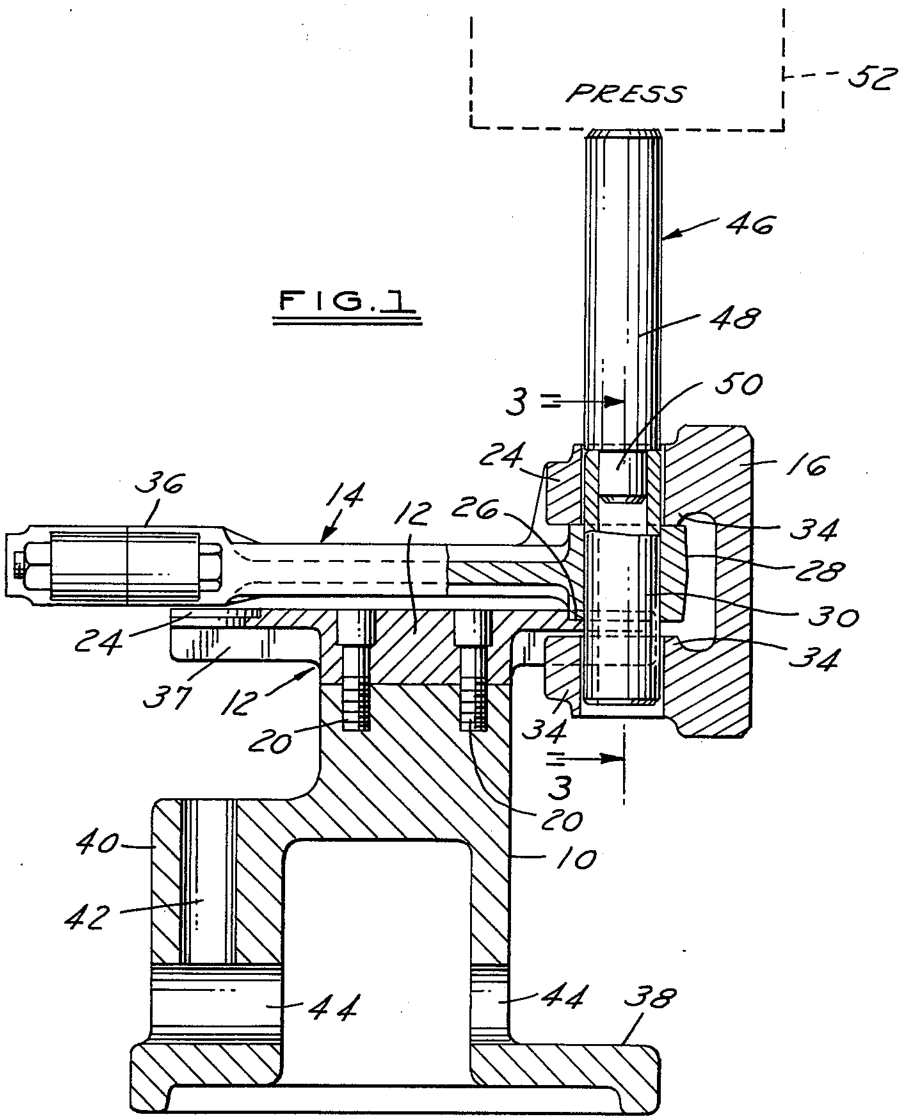
FIG. 1 is a side elevation, partly in section, of a tooling device or fixture showing the arrangement of its parts for removing a piston pin from an assembly of a piston and connecting rod.
Figure 4:
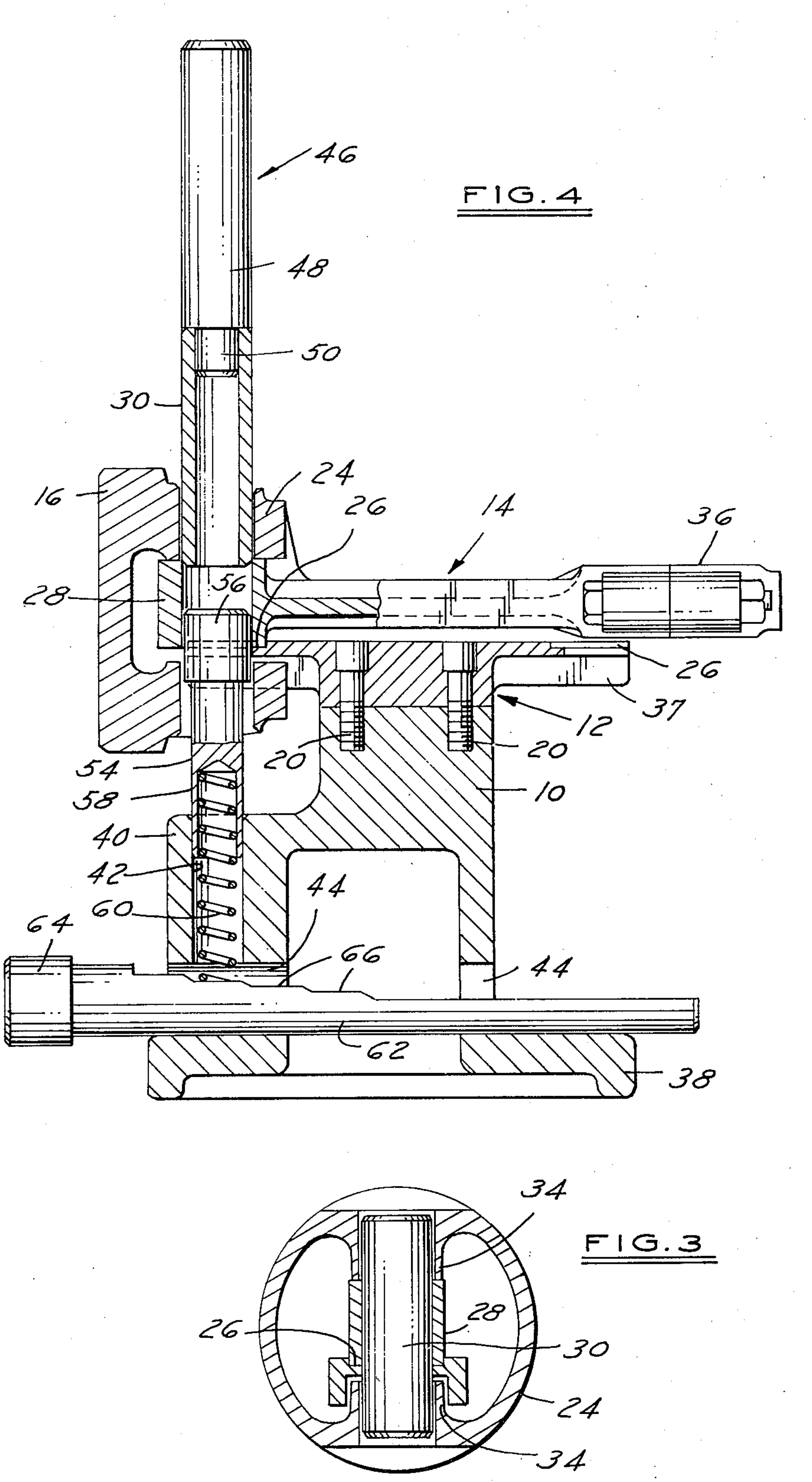
FIG. 4 is a view, similar to FIG. 1, but showing the use of the tooling device for installing a piston pin into the assembly of a piston and connecting rod including the use of additional accessory tooling elements for guiding and centering a piston pin in the course of its installment in the assembly.

In general, the same parts of the tooling device used for removing piston pins are also used for installing either a repaired pin or a replacement for the removed pin. Referring to FIGS. 1 and 4, which respectively show the parts of the tool or fixture for removing and installing piston pins, the base structure of the tool is identified at 10 and surmounting the base and removably attached thereto is a support block 12 which underlies the major extent of a connecting rod 14 whose piston pin is being removed (FIG. 1) or installed (FIG. 4). A comparison of FIGS. 1 and 4 will show that with respect to the two Figures the connecting rod 14 and its piston 16 have been turned end for end with respect to the base structure 10 of the fixture and will further show that in the case of FIG. 4 a few additional operating elements have been added to the basic fixture and are included in FIG. 4.

Figure 2:
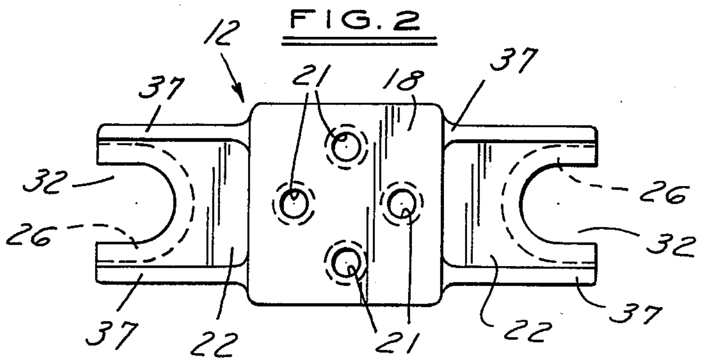
FIG. 2 is a bottom view of a support block for mounting the connecting rod in load supporting position, the support block being double ended and removably securable to the base member of the tooling device.

The support block or plate 12 is preferably a separate element from the base 10 in order that different materials may be used for their respective bodies. Base 10 may be made of a casting of ductile iron whereas the support block 12 may be made of stronger material such as tool steel. As later described herein, the tougher and more expensively made support block 12 is subjected to relatively strong pressures, and its association with a larger cast iron base 10 is less costly than a single block of tool steel for both the base 10 and support block 12. The central portion 18 of the support block 12 is removably secured by four equally spaced apart bolts 20 arranged as shown by their bolt holes 21 in FIG. 2.

Figure 3:
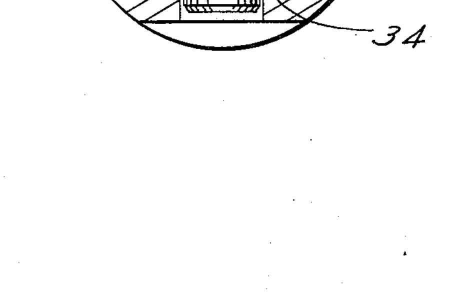
FIG. 3 is a vertical cross sectional view taken along line 3—3 of FIG. 1 and showing in another sectional plane the configuration of the support block for taking the loads which heretofore had been applied to the piston.

The opposite end portions 22—22 of the support block 12 are identically constructed and dimensioned for entry within the opened end of the skirt 24 of the piston 16. When properly introduced into the piston skirt, the support block provides a supporting rest or seat 26 for the boss 28 of the connecting rod 14 through which the piston pin 30 normally extends. To accomplish this supporting arrangement for the boss 28 of the connecting rod, the outer end portions 22—22 of the support block 12 are similarly bifurcated or circularly recessed as at 32—32 to form a forked extremity at each end of the support block. The supporting seats 26—26 extend as a border around such recesses and each assumes a radius of curvature substantially corresponding to that of the bore of the connecting rod boss 28. Preferably, as shown in FIG. 3, each seat 26 is reduced in thickness as compared with the surrounding metal as is evident in FIG. 3 in order to form a shoulder for snugly receiving the external configuration of the boss 28 and an approximately semi-circular lip which intervenes between the boss 28 of the connecting rod and the lower one of a pair of aligned ring-shaped protuberances 34—34 on the inside of the skirt of the piston in which the piston pin is received. So mounted, the piston 16 is maintained out-of-contact with all parts of the tooling device so that all forces applied, both during removal and installation of the piston's wrist pin, are borne by the stronger connecting rod and the supporting block 12.

When the tool or fixture is used to remove a piston pin, the right end of the supporting block 12, as viewed in FIG. 1, is employed to enter the piston skirt 24 and underlay the connecting rod boss 28 to support the same in the manner previously described herein. The opposite end of the supporting block 12 is shaped the same as the right end and extends as far in the opposite direction to likewise underlay and support the connecting rod boss 28 when a piston pin is installed. In either working position, the opposite end portions 22—22 of the supporting block 12 extend sufficiently far enough to underlie and support the crankshaft engaging end 36 of the connecting rod 14. Except for the reduced thicknesses of the two arcuate lips 26—26 and the bolt holes 21, the upper working surface of the supporting block 12 is flat and dimensionally of a size to serve as a mount for both ends of the connecting rod assembly at the same time. Each end portion 22 may be reinforced to withstand the pressures. In the illustrated embodiment of the invention this is achieved by the use of a pair of thicker ribs 37—37 extending parallel to one another along opposite sides of each end portion 22.

It is evident from a comparison of FIGS. 1 and 4 that the base member 10 is not symmetrical. The right side of the base member as viewed in both Figures is provided with a horizontal extending ledge 38 which underlies the piston pin when the connecting rod assembly is properly mounted on the support block 12 and shortens the fall of the piston pin when it is forced out of the connecting rod and piston. The left side of the base 10 is thickened as at 40 for part of the height of base and provided with an open ended vertical extending circular bore 42 whose axis will coincide with the axis of the bore of the boss 28 of a properly mounted connecting rod assembly on the support block 12. The bottom end of the bore 42 opens into a horizontal passage 44 extending through the thickened section 40 of the base and also through the right hand section of the base immediately above the ledge 38.

The same tool element, or one like it, may be used for removing wrist pins from pistons or installing the same therein. Such a tool element is generally indicated at 46 in FIG. 1 and identified with the same reference character in FIG. 4 where the operating parts of the fixture and connecting rod assembly are positioned for installing a piston pin. The tool element 46 is aptly described as a piston pin driver and is formed of two cylindrical sections of different diameters, an axially longer section 48 having a diameter corresponding to or slightly less than the outer diameter of the piston pin to be removed and an axially shorter section 50 forming a reduced co-axial extension of the longer section. The shorter section 50 may have a diameter substantially equal to the inner diameter of the piston pin and form at its juncture with the larger section an abrupt shoulder which abuts the upper exposed end of the piston pin 30 when the smaller section 50 of the driver is introduced thereinto. Thereafter, force is applied to the opposite upper end of the driver member, such as by a power press indicated at 52, to press the piston pin out of the connecting rod where it has a press fit. The pressure applied should not exceed 5,000 pounds of force for the embodiment of the invention illustrated herein.

For the installation of piston pins, the end of the support block over the vertical bore 42 is used as a mount for the piston end of the connecting rod 14 in the manner illustrated in FIG. 4. As in the case of the mounting arrangement of FIG. 1, the connecting rod boss 28 is snugly received on the semi-circular seat 26 which is interposed between the boss 28 and the lower one of the pair of aligned ring-shaped protuberances 34-34 on the inside of the skirt of the piston. In this position, as previously mentioned, the axis of the bore 42 will be coincident with the axis of the wrist pin receiving boss 28 of the connecting rod 14 and the connecting rod will be able to receive a properly sized wrist pin such as indicated and illustrated at 30 in FIG. 4 by the same reference character 30 indicated in FIG. 1.

Either the same or similar wrist pin 30 is removed and installed in the same fixture. However, before the pin 30 is introduced into the piston, the proper one of several available sizes of pin guides or pilots 54 is selected and installed in the piston and connecting rod bores to approximately the extent illustrated so that the enlarged section 56 of the guide is partially introduced into the bore of the connecting rod boss 28 while the balance lies in one of the aligned bores of the piston as shown in FIG. 4. The selected pin guide 54 serves to center the connecting rod in the piston and will also serve to center the assembly of the connecting rod and piston pin in the fixture with the axes of the bores of the connecting rod and piston in alignment. Each pin guide 54 has a sleeve-like extension 58 which slidably fits the upper end of the bore 42 in the base member 10 and terminates short of the horizontal passage 44.

The pin guide 54 is yieldingly urged upwardly by resilient means in the form of a helically coiled spring 60 which is seated at its upper end against the closed end of the sleeve and projects beyond the bottom opened end of the sleeve as far as the horizontal passage 44 for seating upon a surface of variable height. Such a surface is presented by a gauging member 62 whose primary function is to serve as an adjustable stop limiting downward travel of the pin guide. The gauging member 62 is partially circular in cross section for sliding fit in the circular passage 44 and carries a knurled knob 64 for longitudinal adjustment of the gauge within the passage 44. The upper side of the gauging member is shaped with a series of steps 66 extending longitudinally of the member and at progressively differeing heights as shown in FIG. 4. Upon longitudinal movement of the gauging member 62, each step 66 is presentable in line with the vertical bore 42 to receive the lower ends of the coiled spring 60 and of the pin guide 54 and stop further downward advance of the pin guide. In this stopped position, the upper end section 56 of the guide pin 54 should just clear the lower end of the piston pin bore formed by the aligned ring-shaped protuberances 34—34 thereby to automatically locate the piston pin 30 centrally within the connecting rod 14.

It is apparent that as the piston pin 30 is pressed into the upper side of the piston and then into the boss 28 of the connecting rod 14, it engages and forces the spring loaded pin guide 54 to be depressed into the base 10 until it "bottoms out", i.e., its further downward movement is blocked by a selected step on the gauging member 62. In order to accommodate various sizes of piston pins, an assortment of piston pin pilot or guide members 54 are provided, each being designed to guide and pilot a different commonly usable size of piston pin through the bores of the piston and connecting rod and to stop further advance of the piston pin 30 by "bottoming out" when the piston pin is properly located within the connecting rod.

It is apparent that a tool or fixture has been developed for removing and installing piston pins which removes the possibility of detrimental deformation of pistons undergoing such operations. It is also apparent that a tool or fixture for this purpose has been developed which is easier to use than prior art devices of this character. It is further apparent that once positioned on either forked end of the support block, the piston, piston pin and connecting rod are practically self-supporting, whereas the prior art designs require the operator to hold all parts in alignment until a press load is applied.

While a particular embodiment of the invention has been described and illustrated, it will be understood, of course, that it is not desired that the invention be limited thereto since additional modifications may be made. It is, therefore, contemplated by the appended claims to cover any such modifications as fall within the true spirit and scope of the invention.

What is claimed is:

1. An automotive engine tool for removing and installing piston pins including, in combination;

a base member having a support block occupying the upper part thereof and providing a mounting surface for the connecting rod and piston assembly of an automobile engine from which the piston pin is to be removed or installed, said support block being forked shaped at one end to enter the skirt of the piston and partially surround in load bearing relationship the boss of the connecting rod through which the piston pin bore extends, a piston pin driver member of cylindrical shape having a larger diameter section substantially equal to the outer diameter of the pin and a smaller diameter section forming a reduced co-axial extension of the larger section, said reduced extension of the driver member having a diameter substantially equal to the inner diameter of the piston pin and forming at its juncture with the larger section an abrupt shoulder for first abuting the end of the piston pin into which the smaller section of the driver member is extended and then for driving the piston pin along the bore of said connecting rod boss, and a gauge member disposed in alignment with the travel of the piston pin for terminating further advancements of the piston pin by the piston pin driver, said gauge member being adjustably mounted in the base member for varying its positional settings to accommodate piston pins of different sizes, said gauge member being provided for such purpose with a stepped contour serving as a series of blocking surfaces each of which is presentable opposite to the bore into which a piston pin is being installed in order to stop further advance of the piston pin when it is centered within the connecting rod bore.

* * * * *